Figure 6:
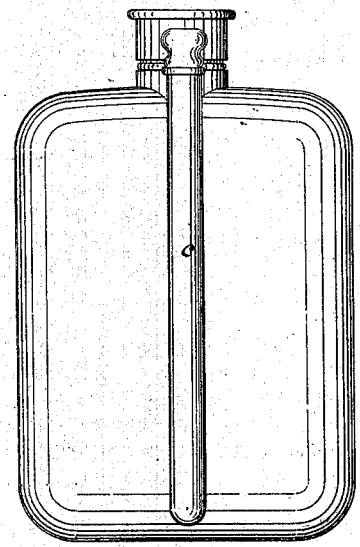

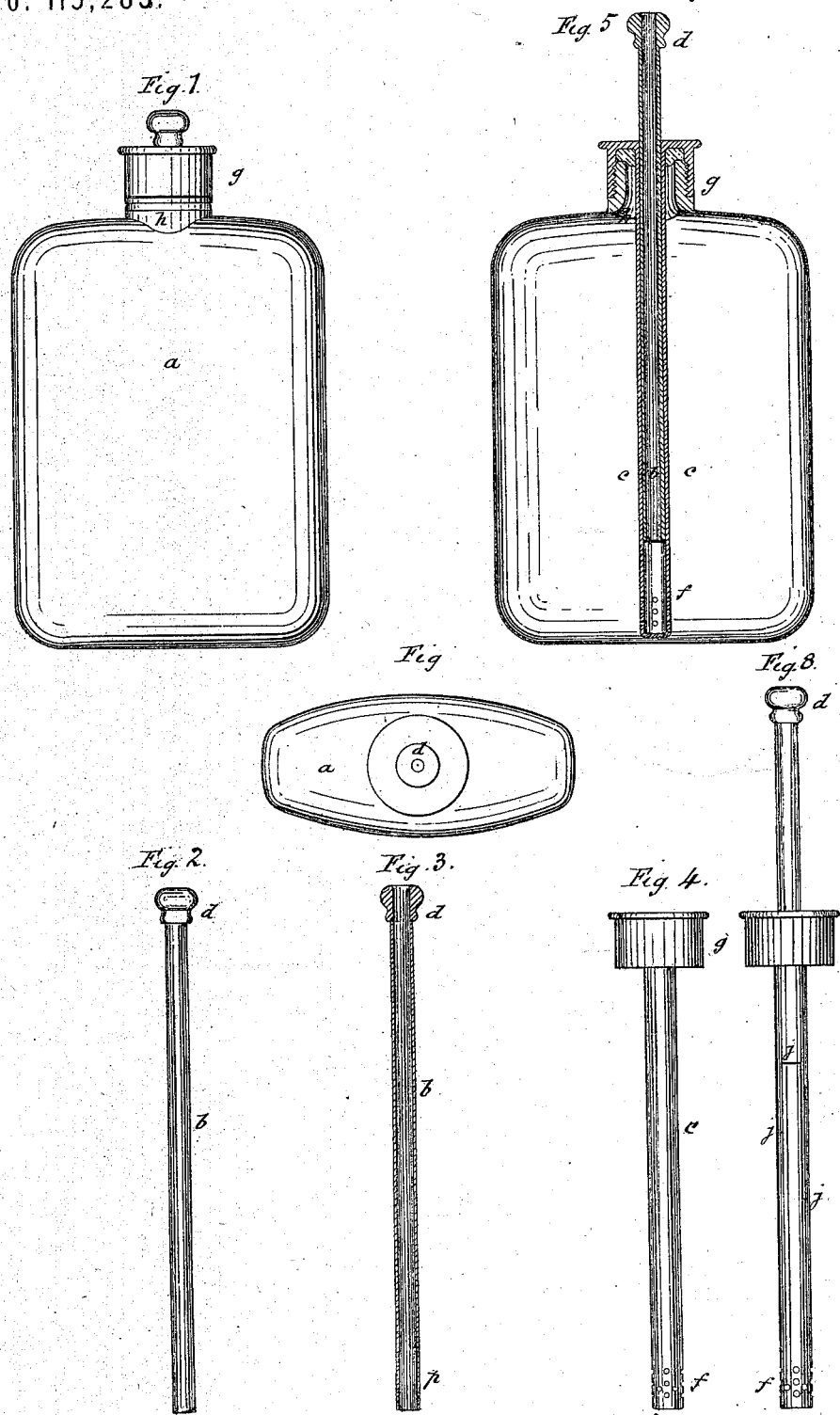
HENRY W. DEE.
Improvement in Liquid-Flasks.
No. 115,283. Patented May 30, 1871.

HENRY W. DEE.
Improvement in Liquid-Flasks.
No. 115,283. Patented May 30, 1871.

115,283

UNITED STATES PATENT OFFICE.

HENRY WILLIAM DEE, OF LONDON, ENGLAND.

IMPROVEMENT IN LIQUID-FLASKS.

Specification forming part of Letters Patent No. 115,283, dated May 30, 1871.

*To all whom it may concern:*

Be it known that I, HENRY WILLIAM DEE, of Sherwood street, London, in the county of Middlesex, England, have invented or discovered certain new and useful "Improved Apparatus for Facilitating the Withdrawal of Liquids from Flasks, Bottles, Jars, and other Vessels and Pipes," which improvements I believe will be of great public utility; that I am the inventor thereof, and that the following is a full, true, and exact description thereof, reference being had to the drawing hereunto annexed—that is to say;

My invention relates to certain improved apparatus which can be fitted to flasks, bottles, jars, and other vessels, whereby the liquid contents can readily be withdrawn. The apparatus can also act as a stopper to prevent escape of the liquid when the contents are not required to be drawn off. The invention consists in fitting two tubes, one within the other, in the neck or body of a flask, bottle, jar, or other vessel or pipe in which liquids are placed. The outer tube is perforated at its lower end, and the inner tube, packed or not, is free to be drawn up and down in the outer one to uncover or cover the perforations. The inner tube is open at both ends, while the outer tube is closed at its lower end with the exception of the perforations before spoken of. When the inner tube is pushed down the perforations are covered and escape of the liquid is prevented. The apparatus is applicable to bottles or vessels containing effervescing or other drinks, and can be fitted in the side, body, or the neck, or in the stopper, as found most convenient. When the apparatus is used with scent-bottles the inner tube need only be drawn out to uncover some of the holes, and the bottle shaken to sprinkle the liquid.

Figure 7:
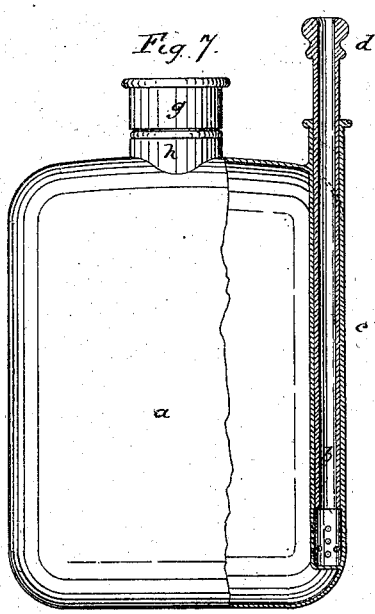

Figure 1 of the accompanying drawing is a view of a drinking-flask, *a*, with my improved apparatus fitted in the ordinary screw cap or stopper. It consists, as before stated, of two tubes, *b* and *c*, one, *b*, being free to slide within the other to uncover openings in the lower end of the outer one, *c*. Figs. 2 and 3 are views of the inner tube *b*, which is open at both ends. The upper part of it is formed with a bulb, *d*, to serve as a mouth-piece or outlet for the liquid when it is necessary to withdraw the contents from the flask. Fig. 4 is a detached view of the outer tube *c* with the perforations *f*, before mentioned. The cap *g* is threaded on the interior, and takes over the neck or mouth *h* of the flask, as will be understood by referring to Fig. 5, which represents a sectional view of the flask shown at Fig. 1. It is not at all essential that the apparatus should be connected with the stopper, as it can be arranged and soldered or otherwise secured to the side wall of the flask, as shown at Fig. 6. Here the lower end of the outer tube is curved and forms a communication with the interior of the flask; by this means the liquid can be inserted through the ordinary neck *b*, and then securely stoppered by screwing cap *g* on. Fig. 7 shows the apparatus applied to the inside of the narrowed wall of a flask, in contradistinction to the outside arrangement shown in the previous figure. These examples are sufficient to show that I am not confined to fitting the apparatus to the cap or stopper. In some cases I groove, reduce in diameter, or form channels *i* in the outside of the inner tube, as shown in Fig. 8, to act as air-passages to the inside of the flask through the slits *j j*, these being made at suitable distances apart to suit the height of liquid therein.

Figure 9:
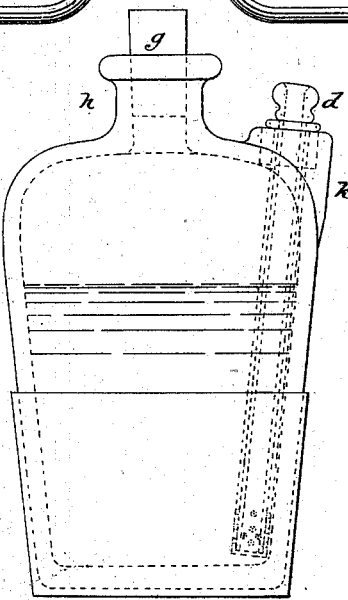

In the foregoing views I have shown separate square flasks with the corners rounded, and such as are made in silver or other metal; but the apparatus is applicable for glass and other flasks or bottles. In Fig. 9 I have shown a glass dram-bottle or pocket-pistol, with an additional opening on the shoulder *k*, through which the apparatus is passed and held secure by a cork or other stopper, the ordinary cork being employed for the central opening or neck *h*.

Figure 10:
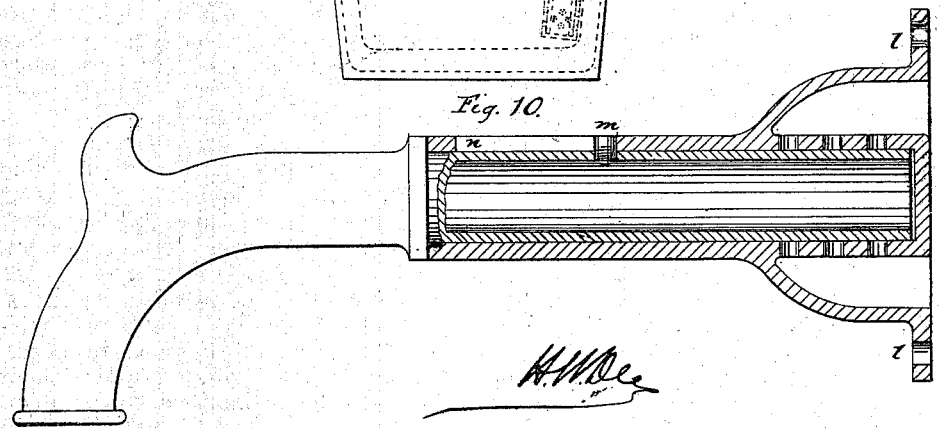

The invention before shown will be found of service for huntsmen and other persons on horseback, as the inner tube can be easily raised by the fingers to uncover the perforations, when, by raising the flask by the same hand, the contents can be withdrawn with facility, thus leaving the other hand free for holding the reins to guide the horse in any direction while the rider is drinking, and without interfering with the ordinary cork or stopper. The invention is applicable to all vessels from which water or other liquid has to be drawn, and in order to show how I propose to arrange it to water-supply pipes for domestic purposes I have in Fig. 10 shown one of them. The inner end of the outer tube, which is perforated, has an outer cap or shield to form a water-space between them, and leading from the main supply-pipe, to which it is to be connected by screws passing through the flange l. The outer end of the inner tube is bent and forms a nozzle, which not only directs the water in a downward direction for filling a bucket or other vessel, but it serves for a gripe for the fingers to pull it out by to uncover the perforations and permit the water to flow. In order to prevent the inner tube being pulled out too far I have fitted it with a pin, m, to ride in the slot n, the length of the slot being made to correspond with the space occupied by the perforations. This plan also prevents the tube being turned. In order to prevent leakage between the tubes under the pressure of the head of liquid, I sometimes use a packing of some kind; and this may be arranged in a ring-groove in the outer tube in a similar manner as the cupped ring of a hydraulic-ram cylinder; or the inner tube may have a packing-ring on it, as shown at p in Fig. 3.

I do not claim, broadly, registering concentric and adjustable tubes, the outer tube rigidly connected with the top of a vessel and the inner capped; but

What I claim is—

The exterior tube c, perforated near its base with its annular interiorly-threaded screw-cap g, through which ascends the interior tube b, terminating in a mouth-piece or handle, all substantially as and for the purpose herein set forth.

In witness whereof I have hereunto set my hand this second day of March, one thousand eight hundred and seventy-one.

H. W. DEE.

Witnesses:
    E. M. DANIEL,
        166 Fleet street, London.
    T. B. JENKINS,
        8 Sherwood street.